United States Patent
Kim et al.

(10) Patent No.: US 9,894,129 B2
(45) Date of Patent: Feb. 13, 2018

(54) DIGITAL LIVING NETWORK ALLIANCE DEVICE FOR SHARING MULTIPLE HOME MEDIA CONTENT AND METHOD THEREFOR

(71) Applicant: SK TELECOM CO., LTD., Seoul (KR)

(72) Inventors: Gyu-baek Kim, Seoul (KR); Young-soon Oh, Seoul (KR); Yong-hee Han, Suwon-si (KR); Woon-sik Lee, Seoul (KR); Hye-min Lee, Seongnam-si (KR); Hyu-dae Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 261 days.

(21) Appl. No.: 14/637,269

(22) Filed: Mar. 3, 2015

(65) Prior Publication Data

US 2015/0229696 A1    Aug. 13, 2015

Related U.S. Application Data

(63) Continuation of application No. PCT/KR2013/007957, filed on Sep. 4, 2013.

(30) Foreign Application Priority Data

Sep. 4, 2012   (KR) .................... 10-2012-0097933

(51) Int. Cl.
*H04L 12/28* (2006.01)
*H04L 29/06* (2006.01)
(Continued)

(52) U.S. Cl.
CPC ........ *H04L 65/608* (2013.01); *H04L 12/2812* (2013.01); *H04L 67/12* (2013.01); *H04N 21/43615* (2013.01); *H04N 21/485* (2013.01)

(58) Field of Classification Search
CPC ... H04L 65/608; H04L 67/12; H04L 12/2812; H04N 21/43615; H04N 21/485
See application file for complete search history.

(56) References Cited

U.S. PATENT DOCUMENTS

| | | | |
|---|---|---|---|
| 2009/0030654 A1* | 1/2009 | Koike | ............... H04M 9/082 702/191 |
| 2009/0177971 A1* | 7/2009 | Kim | ................... H04L 67/02 715/739 |

(Continued)

FOREIGN PATENT DOCUMENTS

| | | |
|---|---|---|
| CN | 101646992 A | 2/2010 |
| KR | 1020090012069 A | 2/2009 |

(Continued)

OTHER PUBLICATIONS

International Search Report for PCT/KR2013/007957 dated Dec. 20, 2013.

(Continued)

*Primary Examiner* — Philip Chea
*Assistant Examiner* — Wuji Chen
(74) *Attorney, Agent, or Firm* — Hauptman Ham, LLP

(57) ABSTRACT

A DLNA device for sharing multiple home media content comprises a display unit, an input unit, a communicator, a controller and a data storage unit. The display unit is configured to display a user interface for implementing at least one individual DLNA service scenario. The input unit is configured to receive a DLNA service scenario selection information including server selection information, content selection information and player selection information through the user interface. The communicator configured to communicate with a DLNA network. The controller is configured to perform the at least one individual DLNA service scenario based on the DLNA service scenario selection information received through the input unit. The data (Continued)

2-box push 2-box pull storage unit configured to store scenario selection information, uniform resource identifier (URI) information of a content and playback state information corresponding to each individual DLNA service scenario.

11 Claims, 11 Drawing Sheets

(51) Int. Cl.
    *H04N 21/436* (2011.01)
    *H04N 21/485* (2011.01)
    *H04L 29/08* (2006.01)

(56) References Cited

U.S. PATENT DOCUMENTS

| | | | | |
|---|---|---|---|---|
| 2009/0240785 A1* | 9/2009 | Kikkawa | ........... | H04L 29/12424 709/218 |
| 2009/0300679 A1* | 12/2009 | Hiroi | ........... | H04L 12/2812 725/40 |
| 2009/0327241 A1* | 12/2009 | Douillet | ........... | G06F 17/30029 |
| 2010/0122177 A1 | 5/2010 | Yoshioka | | |
| 2011/0126116 A1* | 5/2011 | Lee | ........... | G08C 17/00 715/739 |
| 2011/0296339 A1* | 12/2011 | Kang | ........... | G06F 3/04815 715/782 |
| 2013/0054795 A1* | 2/2013 | Kang | ........... | H04L 65/4084 709/224 |
| 2014/0006562 A1* | 1/2014 | Handa | ........... | H04L 67/02 709/219 |

FOREIGN PATENT DOCUMENTS

| | | |
|---|---|---|
| KR | 1020090075391 A | 7/2009 |
| KR | 1020110056678 A | 5/2011 |
| KR | 1020110135089 A | 12/2011 |

OTHER PUBLICATIONS

Chinese Office Action dated May 17, 2017 for Chinese Patent Application No. 201380046152.9.

* cited by examiner

| DLNA Service Scenario | Selection Info | | | Playback State Info | | |
|---|---|---|---|---|---|---|
| | Media Server | Media Content | Media Player | URL | Offset Value | ... |
| DLNA Service Scenario 1 | PC | Movie 1 | TV | ... | ... | ... |
| DLNA Service Scenario 2 | Terminal | Music 1 | Audio | ... | ... | ... |

*FIG. 10*

DIGITAL LIVING NETWORK ALLIANCE DEVICE FOR SHARING MULTIPLE HOME MEDIA CONTENT AND METHOD THEREFOR

CROSS-REFERENCE TO RELATED APPLICATION

The present application is a continuation of International Patent Application No. PCT/KR2013/007957, filed Sep. 4, 2013, which is based on, and claims priority to Korean Patent Application No. 10-2012-0097933, filed on Sep. 4, 2012. The disclosures of above-listed applications are hereby incorporated by reference herein in their entirely.

TECHNICAL FIELD

The present disclosure relates to a Digital Living Network Alliance (DLNA) device and method for sharing multiple home media content.

BACKGROUND

The statements in this section merely provide background information related to the present disclosure and do not necessarily constitute prior art.

Recently, home networks are established to enable interconnections and integral management of various devices installed in customer premises such as a PC, a TV, a set-top box, a mobile device, an audio system, an air conditioner, a boiler, lights, a gas valve and a front door. As a protocol for standardization related to sharing of media contents in a home network, the Digital Living Network Alliance (DLNA) is emerging. The DLNA defines device classes for sharing and controlling media over a home network by a Digital Media Server (hereinafter, referred to as "DMS"), a Digital Media Player (or "DMP"), a Digital Media Renderer (or "DMR"), and a Digital Media Controller (or "DMC"). Briefly, a DMS device serves to manage and provide local content over a network, a DMP device serves to retrieve the content managed by the DMS device and plays the content on the player in the DMP device itself. A DMR device receives and plays the content according to a request from a DMC device. The DMC device retrieves the content managed by the DMS and establishes configurations for playback in the DMR and to maintain connections between the DMR and DMS devices.

The DLNA defines three scenarios in relation to basic DLNA services. The DLNA service scenarios include 2-Box Push, 2-Box Pull and 3-Box scenarios.

FIG. 1A is an exemplary diagram of basic DLNA service scenario illustrating a 2-Box Push scenario. As illustrated in FIG. 1A, a content of a device 110 is played on another device 120 and the device 110 serves as a DMS device.

FIG. 1B is an exemplary diagram of basic DLNA service scenario illustrating a 2-Box Pull scenario. As illustrated in FIG. 1B, a principal device 130 plays media of another device 110 and serves as a DMP device.

FIG. 1C is an exemplary diagram of basic DLNA service scenario illustrating a 3-Box scenario. As illustrated in FIG. 1C, a principal device 140 serving as a DMC device causes media of another device 110 to be played by yet another device 120.

Sharing of media content in a home network based on the DLNA service scenarios is basically provided by an on-screen interface designed to share a single medium. In other words, such DLNA service based media sharing is incapable of providing a shared multiple media through individual control of multiple devices.

SUMMARY

In some embodiments, a DLNA device for sharing multiple home media content comprises a display unit, an input unit, a communicator, a controller and a data storage unit. The display unit is configured to display a user interface for implementing at least one unit or individual DLNA service scenario. The input unit is configured to receive a DLNA service scenario selection information including server selection information, content selection information and player selection information through the user interface. The communicator configured to communicate with a DLNA network. The controller is configured to perform the at least one individual DLNA service scenario based on the DLNA service scenario selection information received through the input unit. The data storage unit configured to store scenario selection information, uniform resource identifier (URI) information of a content and playback state information corresponding to each individual DLNA service scenario.

In some embodiments, a method for multiple executions of a plurality of individual digital living network alliance (DLNA) service scenarios between a plurality of DLNA devices, the method comprising: receiving, by a DLNA device, an individual DLNA service scenario selection information for at least one individual DLNA service scenario; transmitting, by the DLNA device, a control instruction to a further DLNA device according to the DLNA service scenario selection information for each individual DLNA service scenario; providing and storing, by the DLNA device, a database of a plurality of individual DLNA service scenario selection informations for respective DLNA service scenarios; and storing respective playback state informations for the respective individual DLNA service scenarios in the database.

BRIEF DESCRIPTION OF DRAWINGS

FIG. 10 is an exemplary diagram of DLNA service scenario selection information and playback state information in a data storage unit, according to one or more embodiments.

DETAILED DESCRIPTION

Figure 1A:
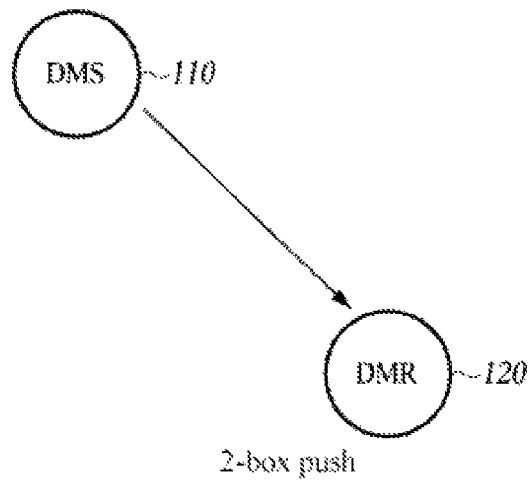
FIG. 1A is an exemplary diagram of basic DLNA service scenario illustrating a 2-Box Push scenario.
Figure 1B:
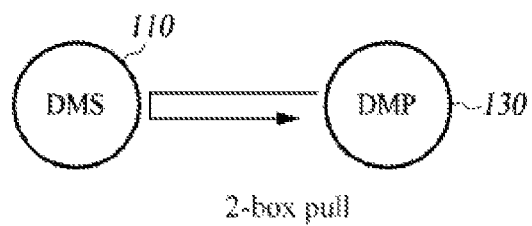
FIG. 1B is an exemplary diagram of basic DLNA service scenario illustrating a 2-Box Pull scenario.
Figure 1C:
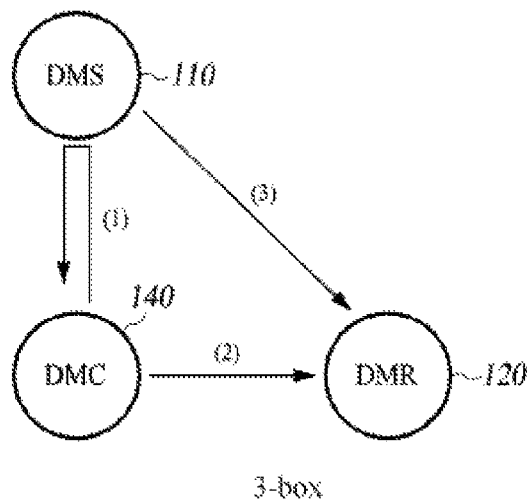
FIG. 1C is an exemplary diagram of basic DLNA service scenario illustrating a 3-Box scenario.

Hereinafter, embodiments of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand the terms are not to imply or suggest the substances, the order or sequence of the components. In addition, one of ordinary skill would understand terms like 'include', 'comprise', and 'have' to be interpreted in default as inclusive or open rather than exclusive or closed unless expressly defined to the contrary. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

One or more embodiments of the present disclosure relates to a DLNA device and method which are capable of recognizing and controlling the state of each media content, even when multiple media players share the media content, by periodically or aperiodically storing DLNA service scenario selection information on each of DLNA service scenarios and playback state information on the media content.

In a home network of a Digital Living Network Alliance (DLNA) environment, DLNA devices respectively serve as a Digital Media Controller (DMC) device, a Digital Media Server (DMS) device, a Digital Media Player (DMP) device, and a Digital Media Renderer (DMR) device. The DMS device has a capability to access media content in a Universal Plug and Play (UPnP) AV area, and serves to store media content or provide the media content to a DMP device or a DMR device. The DMS device enables a DMC device to retrieve media content, and is equipped with broadcast middleware and a broadcast receiver for receiving digital broadcasts. Such functions of the DMS is performed by a mobile device, a personal computer, a CD player, a DVD player, an MP3 player, a set-top box, etc.

The DMP device functions to play the selected media content. Specifically, the DMP device selects and controls media content and play the selected media content. Such operation of the DMP is performed by a mobile device, a TV, a personal computer, etc.

The DMR device functions to play the selected media content. The operation of the DMR is performed by a TV, an AV receiver, a stereo speaker, etc.

The DMC device performs a function of control such that media content of the DMS device is played through the DMR device. A user retrieves media content of the DMS device through the DMC device to find desired media content, and control the DMS device to transmit the media content to a specific DMR device. Such DMC operation is performed by a mobile device, a personal computer, etc. a DLNA device for performing multiple DLNA service scenarios according to at least one embodiment operates as a DMS device and DMC device in a home network of a DLNA environment.

Figure 2:
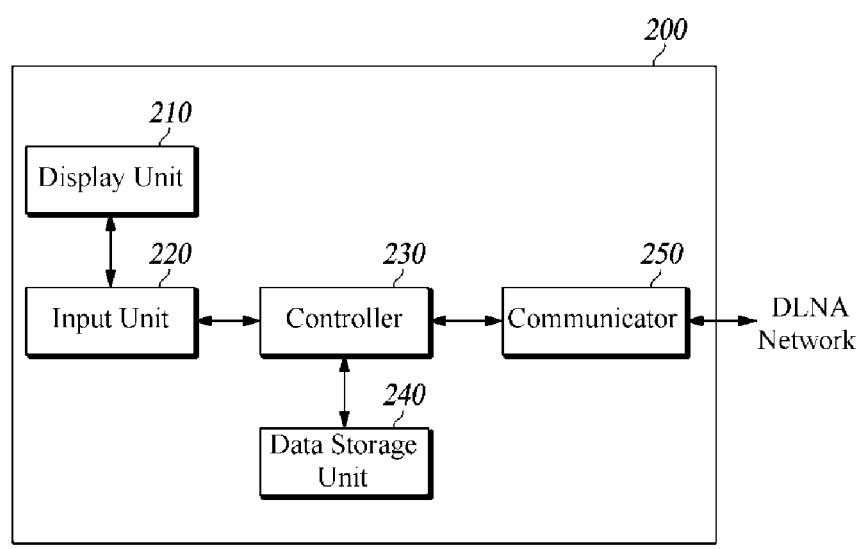
FIG. 2 is an exemplary diagram of a configuration of a DLNA device for performing multiple DLNA service scenarios, according to one or more embodiments.

FIG. 2 is an exemplary diagram of a configuration of a DLNA device 200 for performing multiple DLNA service scenarios according to one or more embodiments.

In some embodiments, the DLNA device 200 for performing multiple DLNA service scenarios includes a display unit 210, an input unit 220, a controller 230, a data storage unit 240, and a communicator 250. While the DLNA device 200 for performing multiple DLNA service scenarios is described as having the display unit 210, the input unit 220, the controller 230, the data storage unit 240, and the communicator 250, this is an exemplary description of the technical idea of one or more embodiments of the present disclosure. Those skilled in the art will appreciate that various modifications, additions and substitutions are possible for the elements included in the DLNA device 200 for performing multiple DLNA service scenarios, without departing from the characteristics of at least one embodiment of the disclosure.

The display unit 210 is configured to display a user interface for implementing at least one individual DLNA service scenario. In some embodiments, the DLNA device 200 for performing multiple DLNA service scenarios serves as a control point in a home network in a DLNA environment by using the interface of the display unit 210.

The user interface does not separately differentiate one interface from another depending on the DLNA service scenarios (the 2-Box Push, 2-Box Pull and 3-Box scenarios) described above. In some embodiments, all of the above scenarios are supported through a series of processes (a media server selection process, a media content selection process, and a media player selection process) similar to the operations of the DMC device (operations of retrieving a DMS device in a DLNA network, identifying the content of the device and selecting a DMR device to play the content) in the 3-Box scenario.

In some embodiments, the DLNA device 200 for performing multiple DLNA service scenarios perform the operations of a DMS device a DMC device together, but does not serve as a DMP device according to the 2-Box Pull scenario. When the 2-Box Pull scenario is being executed by the DLNA device 200 (namely, when the DLNA device 200 is operating as a DMP device), other service scenarios are not additionally driven, in one or more embodiments, since a specific medium is being played on the screen (usually covering the full screen). While the user interface is described in some embodiments as providing the 2-Box Push and 3-Box scenarios, embodiments of the present disclosure are not limited thereto. The 2-Box Push, 2-Box Pull and 3-Box scenarios are provided.

The input unit 220 receives DLNA service scenario selection information about an individual DLNA service scenario using the user interface. In some embodiments, the input unit 220 receives, from the user, media server selection information, media content selection information and media player selection information about an individual DLNA service scenario using a user interface displayed on the display unit 210.

The input unit 220 is implemented through various input means according to a configuration and a function of the DLNA device 200. For example, the input unit 220 is implemented through input means such as a touchscreen, a keypad, and a voice recognition sensor when the DLNA device 200 is a smartphone or a tablet PC, and is implemented through input means such as a mouse and a keyboard when it is a personal computer. In particular, in the case of a smartphone having a touchscreen applied thereto, the input unit 220 and the display unit 210 is replaced with the touchscreen. The input unit 220 transmits, to the controller 230, the selection instruction received from the user.

When the input unit 220 is implemented through a mouse, the "selection instruction" of the user for a graphic user interface (GUI) element is an event for the GUI element, such as 'Click', 'Drag', and 'Mouse over'. When the input unit 220 is implemented through a touch sensor of a touchscreen, the selection instruction is events such as 'Tapping', 'Drag', 'Flicking', and 'Press'.

Herein, the event Mouse Over refers to an operation of positioning a mouse cursor on a specific object for a certain time. The event Tapping, which is an operation of gently pressing and releasing a selected object (a number, a character, a sign, an icon, or the like) once, refers to a touch input such as clicking a mouse in a general PC. The event Drag is an operation of moving a specific selected object to a specific position while pressing (touching) the object and then releasing the object, When Drag occurs, the object is persistently moved in a movement direction while staying pressed, and then fixed by the operation of releasing the object. The event Flicking is an operation of touching and moving a contact point in one of specific directions (Up, Down, Left, Right, and Diagonal directions) and then releasing the contact point. A specific operation is processed according to the movement direction and speed of the Flicking event. The Flicking event refers to an operation of, for example, turning a page. The event Press refers to an operation of contacting and then persistently pressing a contact point, and the event Release refers to an operation of releasing a contact point after touching the contact point.

The controller 230 performs a plurality of individual DLNA service scenario based on the DLNA service scenario selection information received through the input unit 220. In some embodiments, when the DLNA device 200 for performing DLNA service scenario 1 based on media server selection information, media content selection information and media player selection information received through the input unit 220 serves as a DMS device corresponding to first server selection information, the controller 230 transmits, to a DMR device corresponding to first player selection information, first Uniform Resource Identifier (URI) information of content in the DLNA device corresponding to first content selection information.

When the DLNA device 200 serving as the DMS device doubles as a DMS device by receiving DLNA service scenario selection information about DLNA service scenario 2, the controller 230 performs multiple DLNA service scenarios by transmitting, to a DMR device corresponding to second player selection information, second URI information of content corresponding to second content selection information.

When the DLNA device 200 serving as the DMS device doubles as a DMC device by receiving DLNA service scenario selection information about DLNA service scenario 2, the controller 230 performs multiple DLNA service scenarios by receiving, from a DMS device corresponding to second server selection information, the second URI information of the content corresponding to the second content selection information and transmitting the second URI information to the DMR device corresponding to the second player selection information.

Additionally, when the DLNA device 200 operates as a DMC device for controlling DLNA service scenario 1, the controller 230 receives, from the DMS device corresponding to the first server selection information, the first URI information of the content corresponding to the first content selection information, and transmits the first URI information to the DMR device corresponding to the first media player selection information.

When the DLNA device 200 serving as a DMC device doubles as a DMS device by receiving DLNA service scenario selection information about DLNA service scenario 2, the controller 230 performs multiple DLNA service scenarios by transmitting, to the DMR device corresponding to the second player selection information, the second URI information of the content corresponding to the second content selection information.

When the DLNA device 200 serving as the DMC device doubles as a DMC device by receiving DLNA service scenario selection information about DLNA service scenario 2, the controller 230 performs multiple DLNA service scenarios by receiving, from a DMS device corresponding to second server selection information, the second URI information of the content corresponding to the second content selection information and transmitting the second URI information to the DMR device corresponding to the second player selection information.

The controller 230 periodically or aperiodically collects content information of the DLNA devices in a DLNA network, and provides the user with the collected content using a user interface. Specifically, the controller 230 periodically or aperiodically collects information about the content contained in all the DMS devices connected to the DLNA network upon receiving an individual DLNA service scenario through the user interface or in the process of executing the individual DLNA service scenario. The controller 230 also collects information about the content contained in all the DMS devices connected to the DLNA network when it manually receives a collection request for the content information from the user through the user interface.

The controller 230 collects, from a DMR device for each individual DLNA service scenario, playback state information about the media content being played on the DMR device in real time. In addition, the controller 230 constantly collects the playback state information about the media content for the individual DLNA service scenario being executed and transmits the same to the data storage unit 240 even while DLNA service scenario selection information about a new individual DLNA service scenario is received through the input unit 220 and the new individual DLNA service scenario is executed. In some embodiments, when DLNA service scenarios are performed simultaneously many times, the controller 230 provides the user with a multiple media sharing service by constantly managing playback state information for each scenario.

In some embodiments, when the controller 230 receives playback control information such as Stop and Volume Up or Down for media content being multiple-shared and played following the individual DLNA service scenarios, it generates a control instruction for executing playback control information and transmits the same to the DMR device on which the media content is being played. In some embodiments, when the controller 230 receives information about playback control of media content for a DLNA service scenario already being executed in the process of executing another DLNA service scenario, it delivers the relevant control instruction to the DMR device, thereby controlling the media content regardless of the DLNA service scenario in the process of execution, and providing the user with a multiple media sharing service.

The data storage unit 240 stores DLNA service scenario selection information and playback state information according to respective individual DLNA service scenario. In some embodiments, the data storage unit 240 receives selection information such as media server selection information, media content selection information, and media player selection information for respective individual DLNA service scenario, create a database according to playlists, and then stores, in the created database, playback state information including URL information on the media content and an offset value of the playback point of the media content.

The communicator 250 communicates with other DLNA devices in the DLNA network through various wired/wireless communication schemes. In some embodiments, the communicator 250 transmits a control instruction created by the controller 230 to multiple DLNA devices operating as a DMS device and a DMR device through wired/wireless communication schemes.

Figure 3:
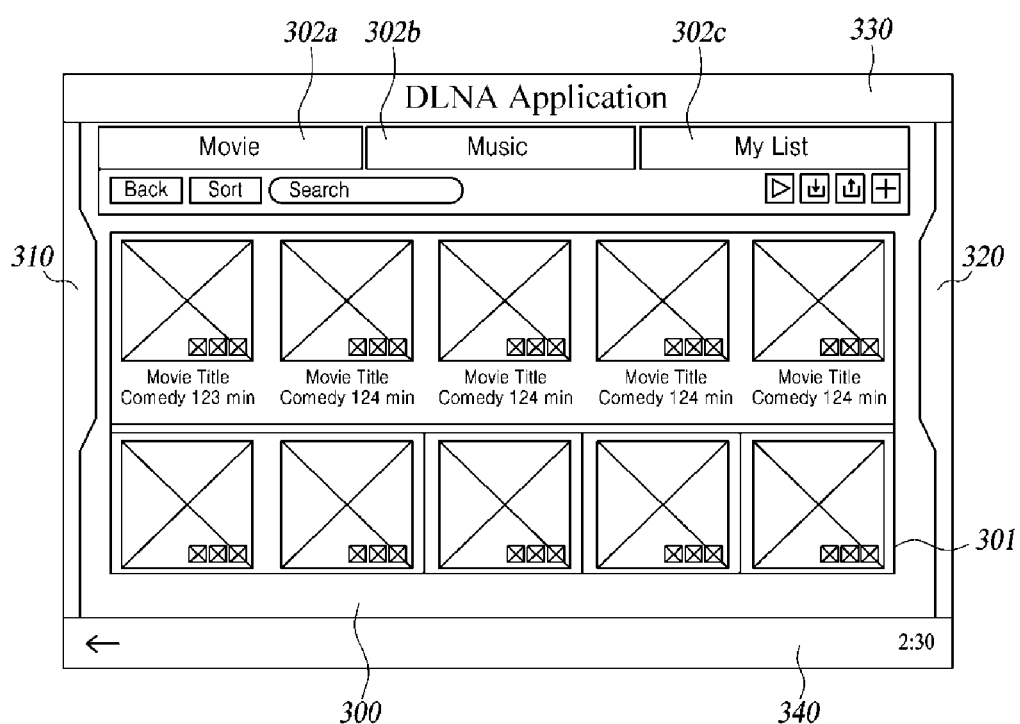
FIG. 3 is an exemplary diagram of a user interface of a DLNA device for a media content selection, according to one or more embodiment.
Figure 4:
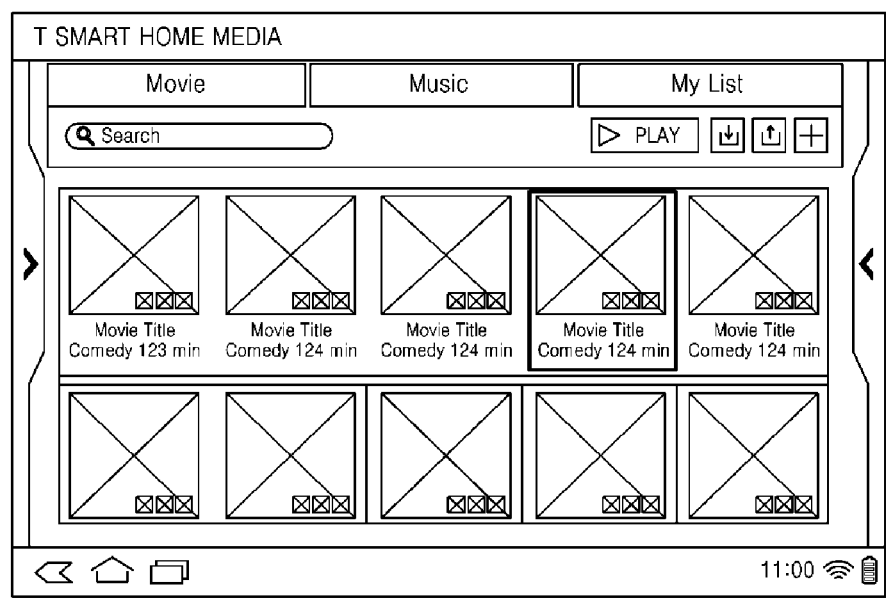
FIG. 4 is an exemplary diagram of an implementation of the user interface illustrated in FIG. 3, according to one or more embodiments.

FIG. 3 is an exemplary diagram of a user interface of the DLNA device 200 for a media content selection, according to one or more embodiment. FIG. 4 is an exemplary diagram of an implementation of the user interface illustrated in FIG. 3, according to one or more embodiments. The DLNA device 200 for performing multiple DLNA service scenarios according to one or more embodiments selects, through the user interface shown in FIGS. 3 and 4, multiple pieces of media content to be played on a DMR player.

The execution screen of an application illustrated in FIG. 3 largely includes a top indicator 330 on which the title of an application is displayed, a bottom indicator 340 on which state information about the application is displayed, and a main frame in which the user interface is implemented.

In the main frame, the main layer 300 providing an interface for the media content selection and a GUI object a pair of toggle bars 310 and 320 disposed on the left and right sides of the main layer 300 respectively are displayed. The toggle bars 310 and 320 are positioned at the top and bottom of the main layer 300 depending on the aspect ratio of the main layer 300, and also configured in the form of a button rather than a bar. The pair of toggle bars 310 and 320 is an example of a GUI object for sensing a user operational instruction about whether or not to display the first sublayer 500 and the second sublayer 700.

The toggle bars 310 and 320 are suitable for a case in which the operational instruction of the user for executing the first sublayer 500 and the second sublayer 700 is a 'Click' event or a 'Drag' event. On the other hand, the toggle bars 310 and 320 are omitted in the case in which the operational instruction of the user corresponds to a 'Mouse Over' event applied to a specific area of the main layer 400 (e.g., the left and right side parts of the main layer 300). Hereinafter, operations of a user interface will be described for when the toggle bars 310 and 320 are provided.

A list of contents contained in a selected DMS device is displayed on the main layer 300. When the application is executed, a list of contents contained in a local DLNA device or contained in a DMS device accessed most recently is displayed as a default value.

The list of contents displayed on the main layer 300 is classified and displayed according to the types of the content contained in the DMS device. The list of content classified into digital video, digital music and digital image according to user selection are provided by arranging, on the main layer 300, a user interface in the form of tap menus 302a to 302c allowing selection of content types. Additionally, the list of contents is provided in the form of a directory or a full list, and each content is represented as a thumbnail, a title, or an icon.

When a user selection instruction is input to the toggle bars 310 and 320, a sublayer providing an interface for the operation of media server selection and a sublayer providing an interface for the operation of media player selection are displayed. Each sublayer is displayed in the Pop-up manner or is displayed slidably over the main layer 300 in the Pull-down manner. Hereinafter, for clarity of description, a sublayer on which the media server selection area is displayed will be referred to as a 'first sublayer', and a sublayer on which the media player selection area is displayed will be referred to as a 'second sublayer'.

The user selects at least one piece of content in the list of contents displayed on the main layer 300. Then, the selected content is included in a playlist to be rendered in a DMR device selected as a media player.

Figure 5:
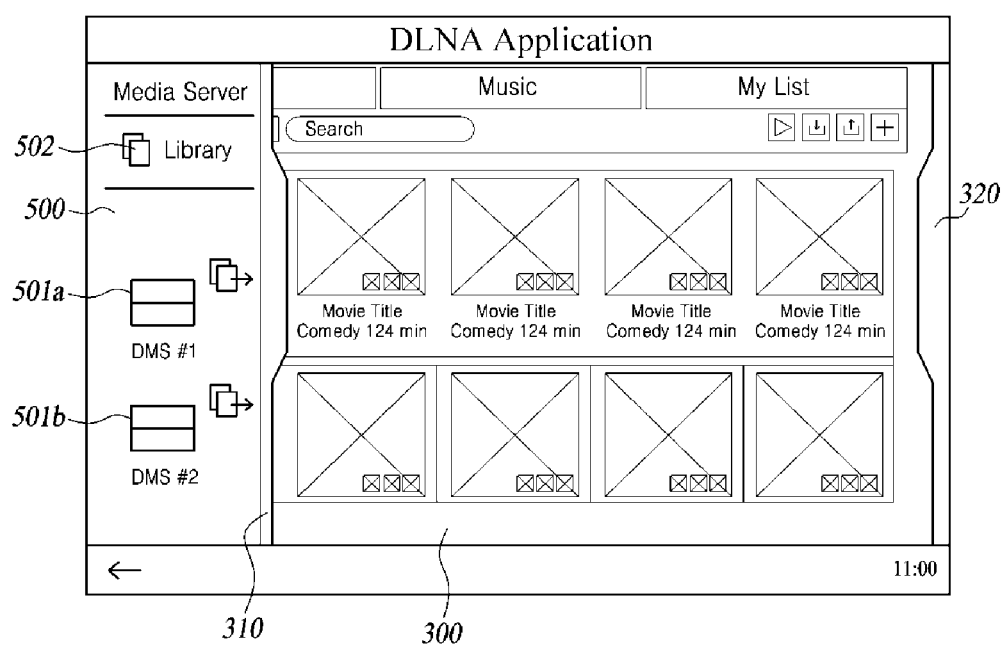
FIG. 5 is an exemplary diagram of a user interface of a DLNA device for a media server selection task, according to one or more embodiments.
Figure 6:
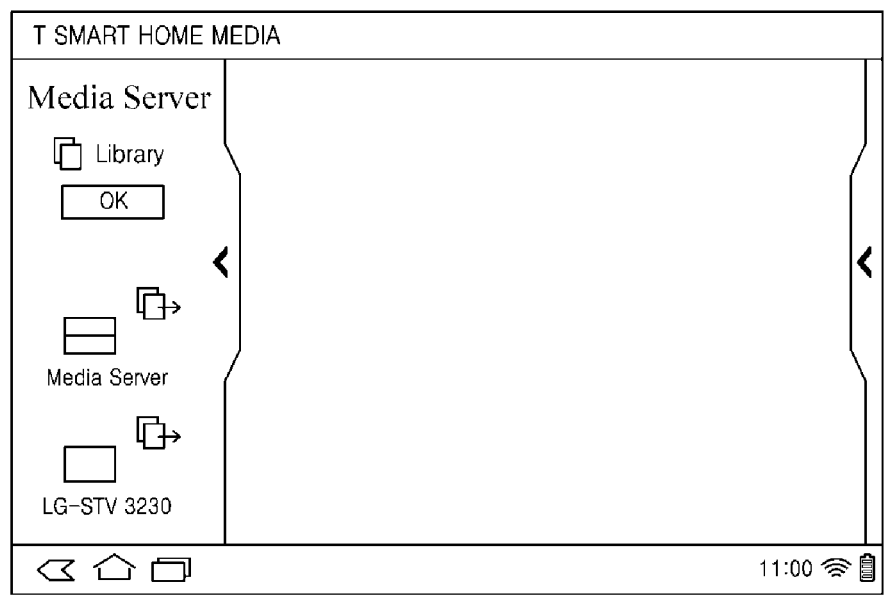
FIG. 6 is an exemplary diagram of an implementation of the user interface illustrated in FIG. 5, according to one or more embodiments.

FIG. 5 is an exemplary diagram of a user interface of the DLNA device 200 for a media server selection, according to one or more embodiments, and FIG. 6 is an exemplary diagram of an implementation of the user interface illustrated in FIG. 5. The DLNA device 200 for performing multiple DLNA service scenarios according to at least one embodiment selects, through the user interface shown in FIGS. 5 and 6, a media server and select media content stored in the media server.

FIG. 5 illustrates the first sublayer 500 displayed on the main layer 300 as a user selection instruction for the toggle bar 310 positioned on the left side of the main layer 300 is input. The media server selection area is displayed on the first sublayer 500. A list of DMS devices (see 501a and 501b) on the DLNA network is provided in the media server selection area. In case where the DLNA device 200 executing the above application has the DMS function, the DLNA device 200 executing the above application is also included in the list of DMS devices.

The main layer 300 is configured to be deactivated while the first sublayer 500 is being displayed. When the main layer 300 is deactivated, a color attribute of the main layer 300, i.e., at least one of tone and transparency are adjusted to a predetermined value to visually inform on the deactivated state, and a message indicating the deactivated state is displayed on the main layer 300.

Once the user completes selection of one device in the list of DMS devices provided on the first sublayer 500, the first sublayer 500 disappears from the main layer 300 in a manner of, for example, sliding, and the main layer 300 is activated. The list of contents contained in the selected DMS is displayed on the activated main layer 300. The user selects at least one piece of content from the displayed list of contents, and the at least one selected piece of content is included in a playlist to be rendered in a DMR device which has been selected or is to be selected as a media player.

Meanwhile, a Library button 502 is provided on the first sublayer 500 on which the interface of the operation of media server selection is provided. When the user selects the Library button 502, an integrated list of contents included in all DMS devices connected to the DLNA network is provided on the main layer 300. The integrated list is collected when the application is executed, periodically collected during execution of the application, or collected when the user selects the Library button.

When the user selects the toggle bar 320 positioned on the right side of the main layer 300, the second sublayer 700 is activated with the media player selection area displayed thereon. The second sublayer 700 is displayed on the main layer 300 in the Pop-up manner, or is displayed by sliding in the Pull-down manner. The first sublayer 500 and the second sublayer 700 do not appear simultaneously. Rather, when one of the sublayers is selected to appear, the other one disappears.

Figure 7:
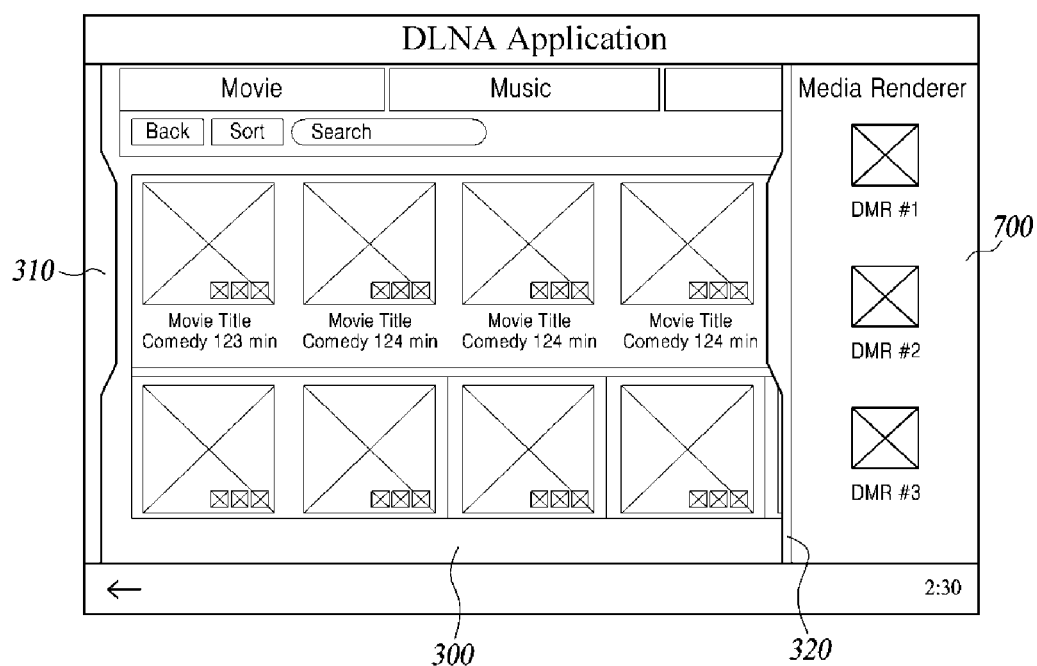
FIG. 7 is an exemplary diagram of a user interface for a media player selection, according to one or more embodiment.

FIG. 7 is an exemplary diagram of a user interface of a DLNA device for a media player selection, according to one or more embodiments.

FIG. 7 illustrates the second sublayer 700 displayed on the main layer 300 as a user selection instruction for the toggle bar 320 positioned on the right side of the main layer 300 is input. An interface for the operation of media player selection is displayed on the second sublayer 700. The interface for the operation of media player selection provides a list of DLNA devices to perform the DMR function on the DLNA network. A DLNA device included in the list not only have the DMR function but also the DMC, DMS and DMP functions. Accordingly, one DLNA device is included in both the list displayed on the first sublayer 500 and the list displayed on the second sublayer 700.

Figure 8:
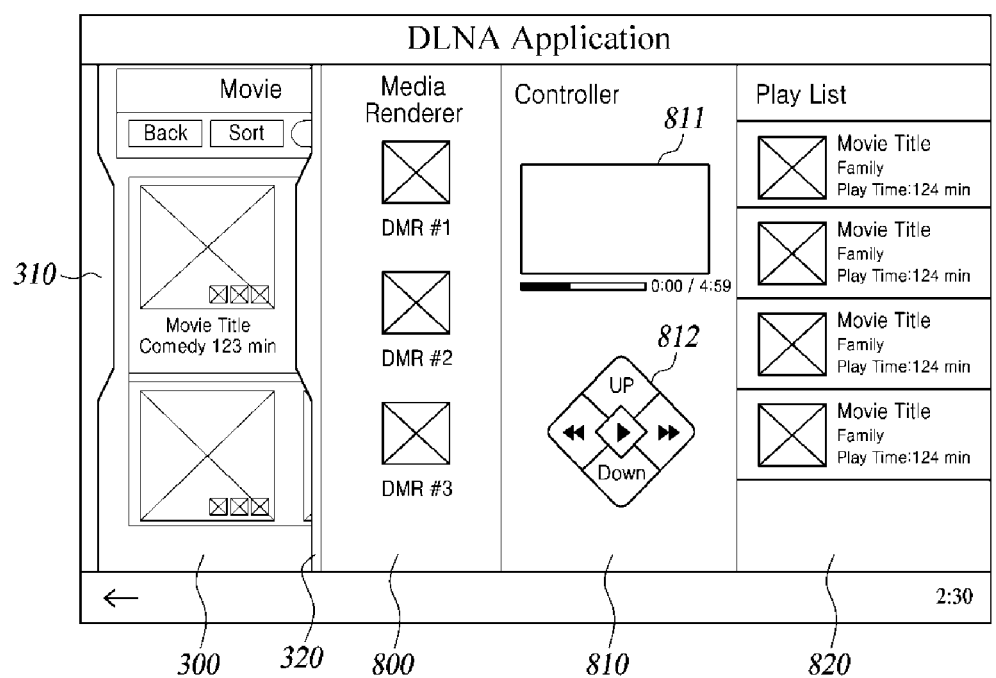
FIG. 8 is an exemplary diagram of a user interface for media player selection and subsequent playback, according to one or more embodiments.
Figure 9:
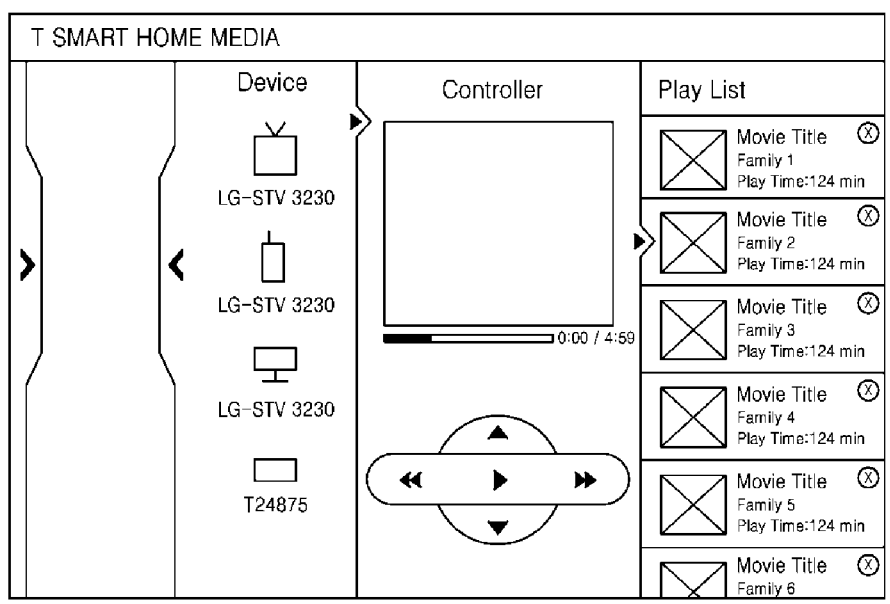
FIG. 9 is an exemplary diagram of an implementation of the user interface illustrated in FIG. 8, according to one or more embodiments.

FIG. 8 is an exemplary diagram of a user interface of the DLNA device 200 for media player selection and subsequent playback of content, according to one or more embodiments, and FIG. 9 is an exemplary diagram of an implementation of the user interface illustrated in FIG. 8.

The second sublayer 700 illustrated in FIGS. 8 and 9 includes three sections 800, 810, and 820. The interface for the operation of media player selection shown in FIG. 7 is displayed in the first section 900. The interface for the operation of media player selection provides a list of DLNA devices performing the DMR function on the DLNA network. A DLNA device included in the list not only have the DMR function but also the DMC, DMS and DMP functions. Accordingly, one DLNA device is included in both the list displayed on the first sublayer 500 and the list displayed on the second sublayer 700. A media rendering panel for control 811 and a media rendering controller panel 812 are displayed in the second section 810. A content included in the playlist displayed in the third section 820 is rendered on the media rendering panel for control 811. Rendering controller GUI elements corresponding to the type of content rendered on the media rendering panel for control 811 are displayed on the media rendering controller panel 812. Contents included in the playlist are rendered in a DMR device. The user checks a screen rendered by a DMR device through the media rendering panel for control 811, and control the screen rendered in the DMR device through the rendering controller GUI elements provided to the media rendering controller panel 812.

When media content selected by the user is being played on a media rendering panel for control 811 of the user interface of FIG. 8 according to the execution of DLNA service scenario 1 in the DLNA device 200 for performing multiple DLNA service scenarios, new DLNA service scenario N is performed by clicking a toggle bar 310 positioned on the left to re-activate the first sublayer 500.

As multiple DLNA service scenarios are performed, a list of contents to be played on a media player currently selected is displayed in the third section 820. If the user desires to check the playback state of a media player for the DLNA service scenario other than the currently selected media player, the user checks the playback state of the desired media player for the DLNA service scenario by selecting the desired media player from the list of media players displayed in the first section 800.

As seen from the description above, the DLNA device 200 for performing multiple DLNA service scenarios performs DLNA service scenarios through an interface for a media server selection task, an interface for a media content selection task and a user interface for a media player selection task as follows.

First, the user selects a playlist and a media player for playback through the user interface. The media content included in the playlist is content stored in the DLNA device 200 functioning as a control point or content stored in a DMS device positioned on the DLNA network.

When the user completes selection of the playlist and the media player for playback, the DLNA device 200 instructs a DMR device to play the content included in the playlist, and the DMR device in turn makes a request for transmission of content to the corresponding DMS device.

If a DMS device storing the content included in the playlist and a DMR device selected as a media player for playback are identical DLNA devices, the DLNA device corresponds to a DLNA device having both the DMS function and the DMR function. In this case, the DLNA device locally plays the content. In some embodiments, the DLNA device renders the content stored in the storage space thereof on the rendering screen thereof.

If the DMS device storing the content included in the playlist and the DMR device selected as a media player for playback are separate DLNA devices rather than local DLNA devices, then the 3-Box scenario is performed among the DLNA service scenarios.

If the DMS device storing the content included in the playlist is a local DLNA device and the DMR device selected as a media player for playback is a separate DLNA device, then the 2-Box Push scenario is performed among the DLNA service scenarios.

Thereafter, the DLNA device 200 receives DLNA service scenarios simultaneously from the user and performs the multiple executions of the DLNA service scenarios through the steps as above. Then, DLNA service scenario selection information about the respective DLNA service scenarios and playback information about the media content are stored in the DLNA device 200 such that state information about not only the media content currently played on the user interface but also the media content for the DLNA service scenario in progress is checked.

FIG. 10 is an exemplary diagram of DLNA service scenario selection information and playback state information in the data storage unit 240 according to one or more embodiments.

As shown in FIG. 10, the data storage unit 240 of the DLNA device 200 for performing multiple DLNA service scenarios stores, in a database, the DLNA service scenario selection information received from the user, namely the media server selection information, media content selection information, and media player selection information according to the respective DLNA service scenarios. In the case of FIG. 10, DLNA service scenario 1 and DLNA service scenario 2 are performed. In DLNA service scenario 1, a TV serving as a media player receives the media content Movie 1 from a PC serving as a media server and plays the same. Thereafter, as each DLNA service scenario is performed, the data storage unit 240 receives the URL information of the media content and playback state information including an offset value of a playback point of the media content, and stores the same in the list in the database built according to the DLNA service scenario selection information. The user checks, through the information stored in the data storage unit 240, playback information about a DLNA service previously executed in real time, even if the multiple executions of the DLNA service scenarios are performed.

Figure 11:
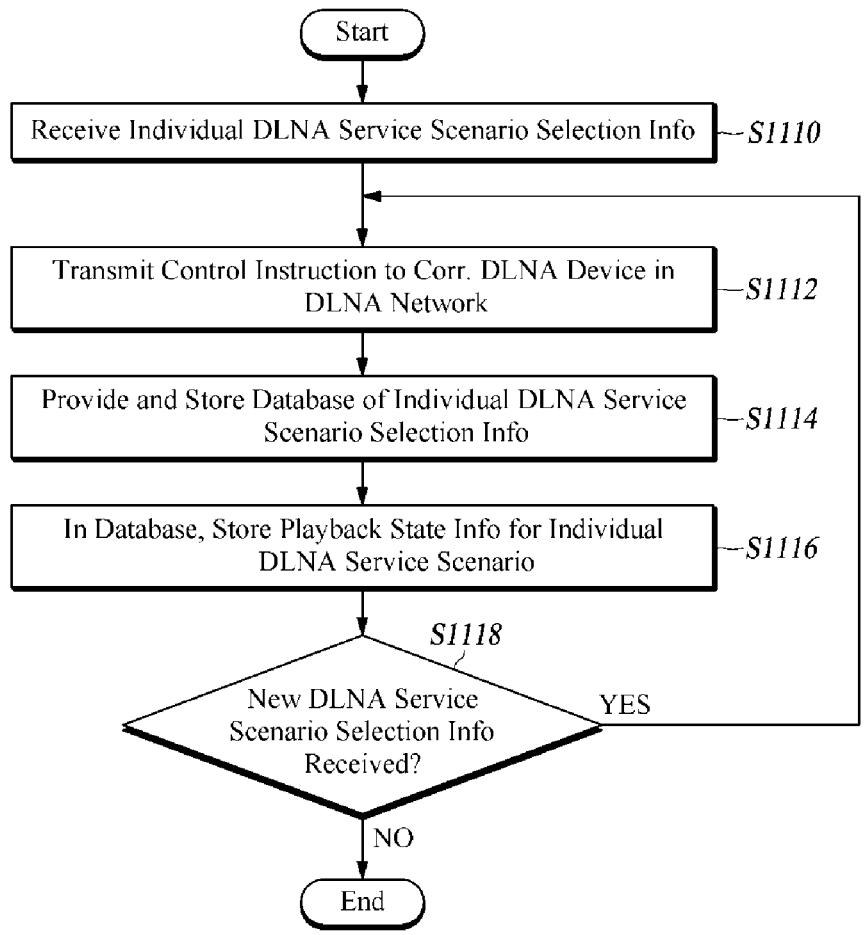
FIG. 11 is a flowchart of a method, performed by a DLNA device according to one or more embodiments, for multiple executions of a plurality of individual DLNA service scenarios.

FIG. 11 is a flowchart of a method, performed by the DLNA device 200 according to one or more embodiments, for multiple executions of a plurality of individual DLNA service scenario.

As shown in FIG. 11, according to the method, performed by the DLNA device 200, for multiple executions of a plurality of individual DLNA service scenarios, an individual DLNA service scenario selection information is received using the user interface of the display unit 210 (S1110). In some embodiments, the input unit 220 receives, from the user, media server selection information, media content selection information and media player selection information about an individual DLNA service scenario through a user interface displayed on the display unit 210. DLNA service scenario selection information about respective DLNA service scenarios is persistently received when execution of one DLNA service scenario is completed. Accordingly, the multiple executions of the DLNA service scenarios is performed.

The controller 230 determines a DLNA device in the DLNA network based on the DLNA service scenario selection information received through the input unit 220 and transmits a control instruction to the DLNA device (S1112). Specifically, when the DLNA device 200 for performing DLNA service scenario 1 based on media server selection information, media content selection information and media player selection information received through the input unit 220 serves as a DMS device corresponding to first server selection information, the controller 230 transmits, to a DMR device corresponding to first player selection information, a first Uniform Resource Identifier (URI) information of content in the DLNA device corresponding to first content selection information. When the DLNA device 200 serving as the DMS device multitasks the DMS device functions by receiving DLNA service scenario selection information about DLNA service scenario 2, the controller 230 performs multiple DLNA service scenarios by transmitting, to a DMR device corresponding to second player selection information, second URI information of content corresponding to a second content selection information.

When the DLNA device 200 serving as the DMS device performs multiple DMC device functions by receiving DLNA service scenario selection information about DLNA service scenario 2, the controller 230 multitasks the DLNA service scenarios by receiving, from a DMS device corresponding to second server selection information, the second URI information of the content corresponding to the second content selection information and transmitting the second URI information to the DMR device corresponding to the second player selection information.

Additionally, when the DLNA device 200 operates as a DMC device for controlling DLNA service scenario 1, the controller 230 receives, from the DMS device corresponding to the first server selection information, the first URI information of the content corresponding to the first content selection information, and transmits the first URI information to the DMR device corresponding to the first media player selection information. When the DLNA device 200 serving as a DMC device performs multiple DMS device functions by receiving DLNA service scenario selection information about DLNA service scenario 2, the controller 230 multitasks the DLNA service scenarios by transmitting, to the DMR device corresponding to the second player selection information, the second URI information of the content corresponding to the second content selection information.

When the DLNA device 200 serving as the DMC device performs multiple DMC device functions by receiving DLNA service scenario selection information about DLNA service scenario 2, the controller 230 multitasks the DLNA service scenarios by receiving, from a DMS device corresponding to second server selection information, the second URI information of the content corresponding to the second content selection information and transmitting the second URI information to the DMR device corresponding to the second player selection information.

The data storage unit 240 receives DLNA service scenario selection information such as media server selection information, media content selection information, and media player selection information for respective individual DLNA service scenario and creates a database according to playlists (S1114), and then stores, in the created database, playback state information including URL information on the media content and an offset value of the playback point of the media content (S1116). The controller 230 periodically or aperiodically collects information about content contained in all the DMS devices connected to the DLNA network upon receiving an individual DLNA service scenario through the user interface or in the process of executing the individual DLNA service scenario. The controller 230 also collects information about content contained in all the DMS devices connected to the DLNA network and transmits the same to the data storage unit 240 when it manually receives a collection request for the content information from the user through the user interface.

The controller 230 collects, from a DMR device for each individual DLNA service scenario, playback state information about the media content being played on the DMR device in real time. In addition, the controller 230 persistently collects the playback state information about the media content for the individual DLNA service scenario being executed and transmits the same to the data storage unit 240 even if DLNA service scenario selection information about a new individual DLNA service scenario is received through the input unit 220 and the new individual DLNA service scenario is executed.

The input unit 220 checks whether or not media server selection information, media content selection information and media player selection information about an individual DLNA service scenario are received from the user through a user interface displayed on the display unit 210 (S1118). When new DLNA service scenario selection information is received, steps S1112 to S1116 are repeated.

Although steps S1110 to S1118 of FIG. 11 have been described as being sequentially performed, this is only an exemplary description of the technical concept of at least one embodiment of the present disclosure. Those skilled in the art will appreciate that various modifications, additions and substitutions are possible, without departing from the characteristics of at least one embodiment of the disclosure. For example, the order of steps shown in FIG. 11 is changed, or one or more of steps S1110 to S1118 is performed in parallel. Therefore, the present disclosure is not limited to the time-series order as shown in FIG. 11.

According to the present disclosure as described above, a DLNA device for sharing multiple media content in a home network configured by DLNA-based media devices controls respective media content by periodically storing DLNA service scenario selection information about respective DLNA service scenarios and playback state information about the media content and recognizing the states of the respective media content in real time even when multiple media players share the media content.

Some embodiments as described above are implemented in the form of one or more program commands that are read and executed by a variety of computer systems and be recorded in any non-transitory, computer-readable recording medium. The non-transitory computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from characteristics of the disclosure. That is, it is understood that the present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

The invention claimed is:

1. A digital living network alliance (DLNA) device for sharing multiple home media content, the device comprising:
a display unit configured to display a user interface for implementing at least one individual DLNA service scenario;
an input unit configured to receive a DLNA service scenario selection information including server selection information, content selection information and player selection information through the user interface, the DLNA service scenario selection information corresponding to the at least one individual DLNA service scenario;
a communicator configured to communicate with a plurality of DLNA devices via a DLNA network;
a storage configured to store the DLNA service scenario selection information, uniform resource identifier (URI) information of a content and playback state information corresponding to the at least one individual DLNA service scenario; and
a controller connected with the display unit, the input unit, the communicator and the storage, and configured to
receive the DLNA service scenario selection information from the input unit and the uniform resource identifier (URI) information of a content and playback state information corresponding to the at least one individual DLNA service scenario from the storage, and
transmit, to the plurality of DLNA devices, a control instruction according to the received DLNA service scenario selection information and the received uniform resource identifier (URI) information of a content and playback state information corresponding to the at least one individual DLNA service scenario in order to perform the at least one individual DLNA service scenario based on the DLNA service scenario selection information,
wherein, when the DLNA device performs a first DLNA service scenario and serves as a digital media server (DMS) device corresponding to first server selection information in first DLNA service scenario selection information, the controller is configured to transmit first URI information of a content in the DLNA device corresponding to a first content selection information in the first DNLA service scenario selection information to a digital media renderer (DMR) device, among the plurality of DNLA devices, corresponding to first player selection information in the first DLNA service scenario selection information, and
wherein, when the DLNA device serves as both (i) the DMS device corresponding to the first server selection information and (ii) a digital media controller (DMC) device by receiving second DNLA service scenario selection information for a second DLNA service scenario, the controller is configured to
receive a second URI information of a content corresponding to a second content selection information from a DMS device corresponding to a second server selection information, and
transmit the second URI information to the DMR device, among the plurality of DNLA devices, corresponding to a second player selection information.

2. The DLNA device of claim 1, wherein
when the DLNA device serves as both (i) the DMS device corresponding to first server selection information and (ii) a VMS device corresponding to second server selection information by receiving second DLNA service scenario selection information for a second DLNA service scenario,
the controller is configured to transmit second URI information of a content corresponding to second content selection information to life DMR device, among the plurality of DNLA devices, corresponding to second player selection information.

3. The DLNA device of claim 1, wherein
when the DLNA device serves as a DMC device for controlling a first DLNA service scenario,
the controller is configured to
receive, from a DMS device corresponding to a first server selection information in the first DNLA service scenario selection information, a first URI information of a content corresponding to a first content selection information in the first DNLA service scenario selection information, and
transmit the first URI information to gall the DMR device, among the plurality of DNLA devices, corresponding to a first media player selection information in the first DNLA service scenario selection information.

4. The DLNA device of claim 3, wherein
when the DLNA device serves as both (i) the DMC device corresponding to the first server selection information and (ii) a DMS device by receiving a second DLNA service scenario selection information for a second DLNA service scenario,
the controller is configured to
transmit a second URI information of a content corresponding to a second content selection information in the second DNLA service scenario selection information to the DMR device, among the plurality of DNLA devices, corresponding to a second player selection information in the first DNLA service scenario selection information.

5. The DLNA device of claim 3, wherein
when the DLNA device serves as both (i) the DMC device corresponding to the first server selection information and (ii) a DMC device by receiving a DLNA service scenario selection information for a second DLNA service scenario,
the controller is configured to
receive, from a DMS device corresponding to a second server selection information in the second DNLA service scenario selection information, a second URI information of a content corresponding to a second content selection information in the second DNLA service scenario selection information, and
transmit the second URI information to the DMR device, among the plurality of DNLA devices, corresponding to a second player selection information in the second DNLA service scenario selection information.

6. The DLNA device of claim 1, wherein the controller is configured to
periodically or aperiodically collects content information of the plurality of DLNA devices in the DLNA network, and
provide a user with the collected content information through the user interface.

7. The DLNA device of claim 1, wherein the controller is configured to
collect a playback state information of a content played by a player for the at least one individual DLNA service scenario, and
transmit the collected playback state information to the storage.

8. The DLNA device of claim 7, wherein
when a new individual DLNA service scenario is executed in one player, the controller is configured to collect a playback state information of a content played by another player for the at least one individual DLNA service scenario.

9. The DLNA device of claim 1, wherein the controller is configured to transmit, responsive to a received playback control information for a content being played according to the at least one individual DLNA service scenario, a playback control instruction for executing the playback control information to a player playing the content.

10. The DLNA device of claim 1, wherein the playback state information stored in the storage comprises the URI information of the content and the playback state information of some or all of offset values of playback points of the content.

11. A method for multiple executions of a plurality of individual digital living network alliance (DLNA) service scenarios between a plurality of DLNA devices, the method comprising:
receiving, by a DLNA device, an individual DLNA service scenario selection information for at least one individual DLNA service scenario, the individual DLNA service scenario selection information including server selection information, content selection information and player selection information;
transmitting, by the DLNA device and to the plurality of DLNA devices via a DLNA network, a control instruction according to the received DLNA service scenario selection information, uniform resource identifier (URI) information of a content and playback state information corresponding to the at least one individual DLNA service scenario in order to perform the at least one individual DLNA service scenario based on the DLNA service scenario selection information;
storing, by the DLNA device, a database of a plurality of individual DLNA service scenario selection information for respective DLNA service scenarios; and
storing respective playback state information for respective individual DLNA service scenarios in the database,
wherein, when the DLNA device performs a first DLNA service scenario and serves as a digital media server (DMS) device corresponding to first server selection information in first DLNA service scenario selection information, the DLNA device transmits first URI information of a content in the DLNA device corresponding to a first content selection information in the first DLNA service scenario selection information to a digital media renderer (DMR) device, among the plurality of DNLA devices, corresponding to first player selection information in the first DLNA service scenario selection information, and
wherein, when the DLNA device serves as both (i) the DMS device corresponding to the first server selection information and (ii) a digital media controller (DMC) device by receiving second DNLA service scenario selection information for a second DLNA service scenario, the DLNA device
receives a second URI information of a content corresponding to a second content selection information from a DMS device corresponding to a second server selection information, and
transmits the second URI information to the DMR device, among the plurality of DNLA devices, corresponding to a second player selection information.

* * * * *